United States Patent [19]

Shimizu et al.

[11] Patent Number: 4,593,625
[45] Date of Patent: Jun. 10, 1986

[54] MOTOR VEHICLE BOGIE

[75] Inventors: Yukiaki Shimizu; Kei Oouchi, both of Hitachi, Japan

[73] Assignee: Hitachi, Ltd., Tokyo, Japan

[21] Appl. No.: 521,549

[22] Filed: Aug. 9, 1983

[30] Foreign Application Priority Data

Aug. 9, 1982 [JP] Japan ............................ 57-137365

[51] Int. Cl.⁴ ............................................. B61F 3/00
[52] U.S. Cl. ................... 105/182 R; 104/291; 105/49; 105/77; 267/63 A
[58] Field of Search ............... 105/49, 76, 77, 157 R, 105/182 R, 182 E; 104/288, 290, 291, 292; 248/635; 267/3, 63 R, 63 A, 153

[56] References Cited

U.S. PATENT DOCUMENTS

| 573,823 | 12/1896 | Leffler | 104/291 |
| 2,781,990 | 2/1957 | Via | 267/63 R X |
| 3,516,364 | 6/1970 | Machefert-Tassin | 105/49 |
| 3,602,149 | 8/1971 | Lich | 105/49 X |
| 3,912,991 | 10/1975 | Moyse | 104/292 |
| 3,958,669 | 5/1976 | Schmied | 105/77 X |
| 4,440,092 | 4/1984 | Sobolewski | 105/49 |

FOREIGN PATENT DOCUMENTS 997305 7/1965 United Kingdom .................. 267/3

Primary Examiner—Randolph A. Reese
Attorney, Agent, or Firm—Antonelli, Terry & Wands

[57] ABSTRACT

A vehicle bogie which includes a pair of mechanical bearings mounted on shafts of wheel assemblies and U-shaped beam surrounding the shafts and bridging the pairs of mechanical bearings. A linear induction motor is suspended from the beams, with the linear induction motor being coupled to the beams by a universal joint with the shafts being permitted to move in horizontal and vertical planes.

2 Claims, 5 Drawing Figures

MOTOR VEHICLE BOGIE

BACKGROUND OF THE INVENTION

The present invention relates to a vehicle construction and, more particularly, to a motor bogie or carriage for a vehicle powered or driven by a linear motor means.

Motor vehicles powered by linear motor drive sources have been proposed wherein a linear motor means is directly suspended from a shaft of the vehicle bogie or carriage. For this purpose, for example, pairs of suspension means such as, for example, mechanical journal bearings are mounted on shafts of the vehicle, with a primary apparatus of a linear induction motor, including an iron core and a coil unit wound on the core, being suspended from the suspensions under a floor of the motor vehicle, and with the secondary means of the linear induction motor such as, for example, a reaction plate, being disposed on a vehicle support means such as the ground. Generally, the secondary apparatus includes an integral iron plate and aluminum plate.

It is possible to change a position of the primary and secondary means and, for example, when the secondary means of the linear induction motor is mounted on the carriage or bogie, the primary apparatus is arranged on the support means. When either of the primary or secondary means is rigidly suspended from the shaft means of the wheel assemblies of the carriage or bogie, a distance between the primary and secondary means remains unchanged and, consequently, the operating characteristics of the linear induction motor becomes very stable. However, when the linear motor means is rigidly mounted on the shaft means of the wheel assemblies of the bogie or carriage of the vehicle, the shaft means are prevented from rotating about their respective centers in a horizontal and vertical plane. Consequently, the ability of the carriage or bogie of the motor vehicle to follow the vehicle guide rail is disadvantageously significantly reduced.

Moreover, as the linear motor means is suspended directly from the shaft or shafts of the carriage or bogie, considerably large bending moments act on a central portion of the shaft or shafts.

SUMMARY OF THE INVENTION

The aim underlying the present invention essentially resides in providing a bogie or carriage for a linear induction motor driven vehicle which improves an ability of the vehicle to follow the vehicle guide rails.

In accordance with advantageous features of the present invention, a linear induction motor powered vehicle is provided wherein a linear motor means is suspended from at least one beam means bridged or suspended between a pair of suspension means mounted on a shaft of the bogie or carriage.

Advantageously, in accordance with further features of the present invention, at least one universal or flexible joint means is provided for coupling the beam to the linear motor means.

The beam means may, in accordance with the present invention, have a substantially U-shaped cross-sectional configuration and be disposed so as to surround the shafts of wheel assemblies of the vehicle bogie or carriage.

In accordance with additional features of the present invention, the suspending means are disposed between respective wheel means of the wheel assembly and the linear motor means.

Preferably, the universal joint means includes a pin means mounted on the beam means, with the pin means having large diameter outer ends which progressively become smaller or taper in a direction of a center thereof, and with an annular resilient member being press fitted and configured to accommodate the taper of the pin means. A receiving means is provided having an opening configured so as to enable a press fitting about a periphery of the resilient means, with the linear motor means being fixed to the receiving means.

The linear motor means may, in accordance with the present invention, include a coil means wound around a core of, for example, iron.

Accordingly, it is an object of the present invention to provide a bogie or carriage for a linear induction motor powered vehicle which improves the trackability along the vehicle guide rail means.

Another object of the present invention resides in providing a bogie or carriage for a linear induction motor powered vehicle which reduces the bending moments applied to the shaft means of the wheel assemblies of the vehicle.

A still further object of the present invention resides in providing the bogie or carriage for a linear induction motor driven vehicle which ensures a stable operation of the linear induction motor.

Yet another object of the present invention resides in providing a carriage or bogie for a linear induction motor driven vehicle which is simple in construction and therefore relatively inexpensive to manufacture.

A further object of the present invention resides in providing a carriage or bogie for a linear induction motor driven vehicle which functions reliably under all operating conditions.

These and other objects, features, and advantages of the present invention will become more apparent from the following description when taken in connection with the accompanying drawings which show, for the purposes of illustration only, one embodiment in accordance with the present invention.

DETAILED DESCRIPTION

Figure 1:
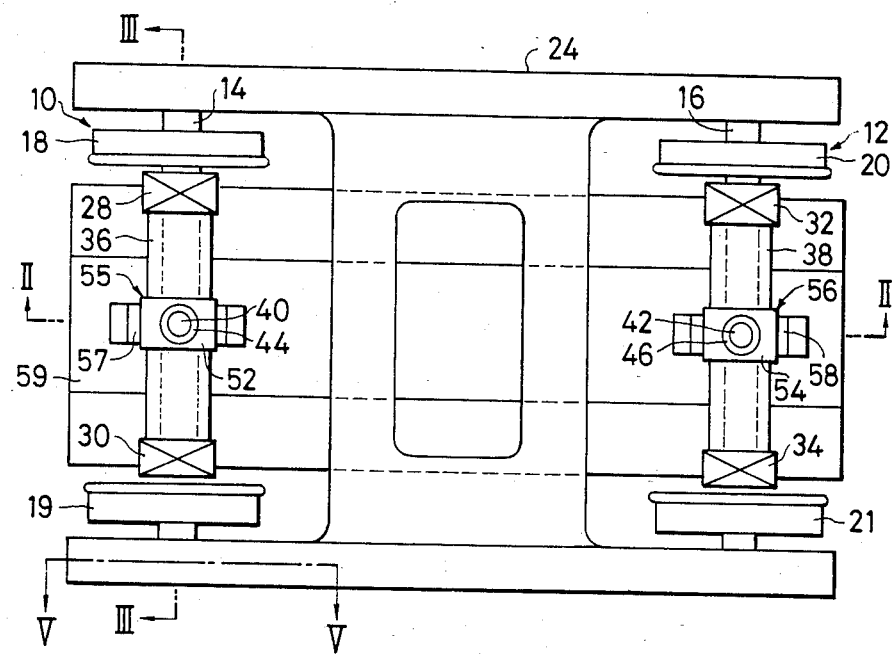
FIG. 1 is a plan view of a bogie or carriage for a linear induction motor driven vehicle constructed in accordance with the present invention.

Referring now to the drawings wherein like reference numerals are used throughout the various views to designate like parts and, more particularly, to FIG. 1, according to this figure, wheel assemblies generally designated by the reference numerals 10, 12 include shafts 14, 16 having pairs of wheels 18, 19 and 20, 21 mounted at respective ends of the shafts 14, 16.

Figure 5:
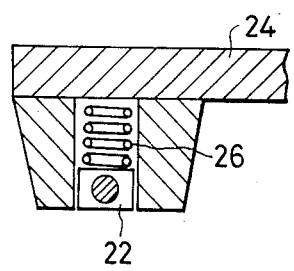
FIG. 5 is a cross-sectional view taken along the line V—V in FIG. 1.

As shown in FIG. 5, mechanical bearing block means 22 are mounted at respective ends of the shafts 14, 16 and a bogie or carriage frame 24 is mounted on the bearing block means 22, with suspension spring means 26 being inserted or interposed between the frame 24 and the bearing block means 22. By virtue of the provision of the mechanical bearing block means 22 and spring means 26, the wheel assemblies 10, 12 are movable with respect to the frame 24 in a vertical direction.

Figure 3:
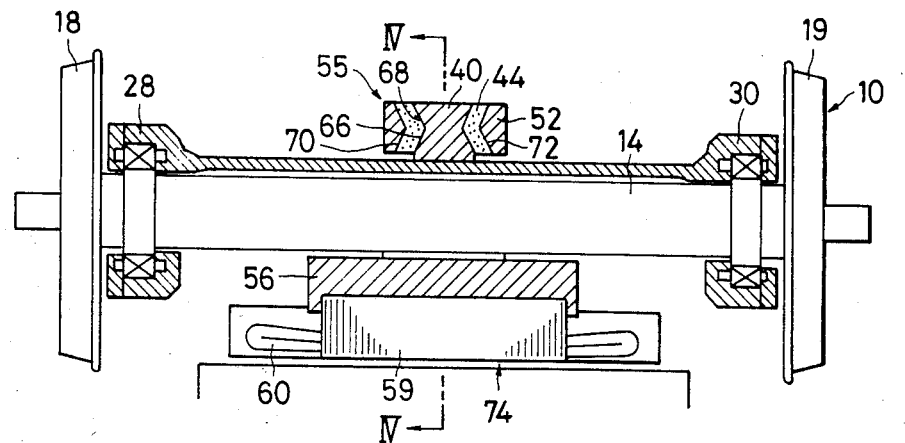
FIG. 3 is a cross-sectional view taken along the line III—III in FIG. 1.

As shown in FIG. 1, pairs of suspension means 28, 30 and 32, 34 constructed as, for example, mechanical bearing block means, are mounted at respective ends of the shafts 14, 16 at a position inside of the wheels 18, 19 and 20, 21. Beams fashioned, for example, as U-shaped pipe means 36, 38, respectively surround the shafts 14, 16 and bridge the respective pairs of suspension means 28, 30 and 32, 34. As shown in FIG. 3, the U-shaped pipe means 36, 38 are rigidly bonded to the suspension means 28, 30 and 32, 34 by, for example, welding or the like.

Figure 2:
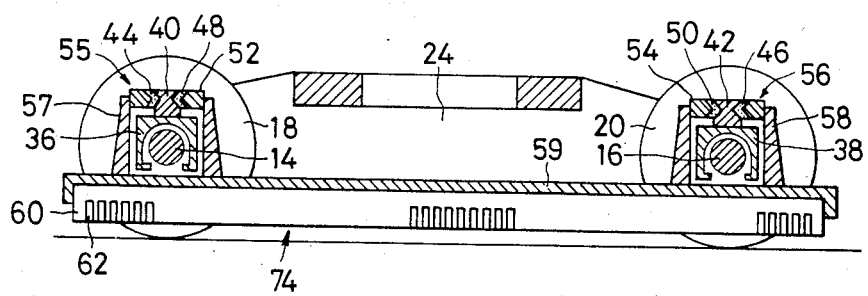
FIG. 2 is a cross-sectional view taken along the line II—II in FIG. 1.
Figure 4:
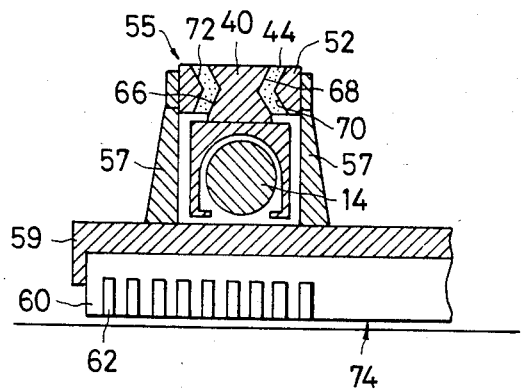
FIG. 4 is a cross-sectional view taken along the line IV—IV in FIG. 3.

As shown most clearly in FIGS. 2, 3 and 4, tapered pins 40, 42 are disposed or mounted in openings 48, 50 provided in receiving members 52, 54 respectively disposed in a central area of the pipe means 36, 38, with annular resilient members 44, 46 such as, for example, cured synthetic rubber members, being press fitted on a peripheral outer surface of the tapered pins 40, 42. The openings 48, 50, provided in the receiving members 52, 54, are configured or sized so as to enable a press fitting of the resilient members 44, 46 therein. The tapered pins 40, 42, annular resilient members 44, 46, and receiving members 52, 54 respectively form universal or flexible joint means generally designated by the reference numerals 55, 56.

As shown in FIGS. 2 and 4, the receiving members 52, 54 are fixed to a bracket means 57, 58 of a supporting frame 59. An iron core 60 and a call unit 62, wound on the core 60, are fixed to the supporting frame 59.

The tapered pin means 40, 42 have a normal taper 66 which is progressively reduced from an outer end thereof toward the center and a reverse taper 68 which progressively increases from the center toward the opposite end of the pin as shown most clearly in FIGS. 3 and 4. Moreover, the openings 48, 50 and the annular receiving members 52, 54 have tapers 70, 72 corresponding to the tapers 66, 68 of the tapered pin means 40, 42. Therefore, the resilient members 44, 46 have a substantially X-shaped cross-sectional configuration. By virtue of the above noted suspension arrangement, all the weight of a linear induction motor means generally designated by the reference numeral 74 and the supporting frame 59 is supported by the normal tapers 66 of the tapered pins 40, 42. Therefore, the deformable annular resilient members 44, 46 and the tapered pins 40, 42 allow the shafts 14, 16 to move in lateral and vertical directions as well as rotating in any of three mutually perpendicular planes. In this connection, rotation in a horizontal plane is known as yawing, in a vertical plane perpendicular to the direction of travel is know as rowing, and in a vertical plane parallel to the direction of travel is know as pitching. Consequently, with the suspension arrangement of the present invention, it becomes easy to follow the various vehicle guide rail conditions so that the trackability of the vehicle during, for example, negotiation of a curve, is significantly improved.

Since the linear induction motor means 74 is not directly suspended from the shafts 14, 16, the position of the suspending means 28, 30 and 32, 34 is not limited and may be varied to other positions disposed between the respective wheels 18, 19 and 20, 21 and the linear induction motor means 74. Moreover, since all of the weight of the linear motor apparatus is supported by the beam or U-shaped pipes 36, 38, the bending moments to the shafts 14, 16 are reduced. Furthermore, the U-shaped cross sectional configuration of the beams provide a high resistance to the bending moments.

As can readily be appreciated, the suspension arrangement of the present invention may be used to support a reaction plate of the linear induction motor 76, with the linear induction motor then being mounted in the support means and/or guide rail for the motor vehicle.

While we have shown and described only one embodiment in accordance with the present invention, it is understood that the same is not limited thereto but is susceptible of numerous changes and modifications as known to those having ordinary skill in the art and we therefore do not wish to be limited to the details shown and described herein, but intend to cover all such modifications as are encompassed by the scope of the appended claims.

We claim:

1. A bogie for a vehicle, the bogie comprising:
   a linear induction motor means,
   a frame means,
   a plurality of shaft means having wheel means disposed at respective ends thereof,
   means for rotatably mounting said shaft means to said frame means,
   a pair of suspension means mounted on each of said shaft means, said pair of suspension means being respectively disposed between said linear induction motor means and the wheel means on said respective shaft means,
   a substantially U-shaped cross-sectional beam means bridged between each of said pair of suspension means, each of said beam means surrounding a respective shaft means on an upper portion and two side portions thereof and being connected to each of said pair of suspension means,
   means for suspending said linear induction motor means from each of said beam means including at least one universal joint means for enabling a movement of said linear induction motor means in any of three mutually perpendicular planes, each of said suspending means surrounding a respective beam means, and
   said beam means supports all of the weight of said linear induction motor means through said suspending means.

2. A bogie for a vehicle, the bogie comprising:
   a linear induction motor means,
   a frame means,
   a pair of shaft means having wheel means disposed at respective ends thereof,
   means for rotatably mounting said pair of shaft means to said frame means,
   a pair of suspension means mounted on each of said pair of shaft means at a position inside of the wheel means, each of said pair of suspension means being respectively disposed between said linear induction motor means and the wheel means on said respective shaft means,
   a pair of substantially U-shaped cross-sectional beam means bridged between each of said pair of suspension means, each of said pair of beam means surrounding a respective shaft means on an upper portion and two side portions thereof and being rigidly bonded to said respective suspension means, a pair of universal joint means for suspending said linear induction motor means from each of said pair of beam means for enabling a movement of said linear induction motor means in any of three mutually perpendicular planes, said pair of universal joint means surrounding a respective beam means and being mounted on a central portion of said pair of beam means, each of said suspending means surrounding a respective beam means, and said pair of beam means supports all the weight of said linear induction motor means through said pair of universal joint means.

* * * * *